(12) United States Patent
Yoshida

(10) Patent No.: US 8,972,479 B2
(45) Date of Patent: Mar. 3, 2015

(54) METHODS AND APPARATUS FOR ONLINE PROGRAM APPLICATION EXECUTION BETWEEN SERVERS

(75) Inventor: Kazushi Yoshida, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 364 days.

(21) Appl. No.: 13/606,282

(22) Filed: Sep. 7, 2012

(65) Prior Publication Data

US 2013/0144929 A1 Jun. 6, 2013

(30) Foreign Application Priority Data

Dec. 1, 2011 (JP) ................................. 2011-263650

(51) Int. Cl.
*G06F 15/16* (2006.01)
(52) U.S. Cl.
USPC ............ 709/201; 709/203; 709/217; 709/219
(58) Field of Classification Search
USPC .................................. 709/201, 203, 217, 219
See application file for complete search history.

(56) References Cited

U.S. PATENT DOCUMENTS

2009/0221367 A1\* 9/2009 Longley et al. ................. 463/32
2010/0325287 A1\* 12/2010 Jagadeeswaran et al. .... 709/227

\* cited by examiner

*Primary Examiner* — Hee Soo Kim
(74) *Attorney, Agent, or Firm* — Matthew B. Dernier, Esq.; Gibson & Dernier LLP

(57) ABSTRACT

An information processing system includes a first server and a second server. The first server includes a first executing unit configured to execute an application at a first speed, using input information items sequentially obtained, and a first transmission unit configured to send a result of execution of the application to a terminal. The second server includes a reproduction data obtaining unit configured to obtain reproduction data containing the input information items sequentially obtained, for reproducing a state of the first executing unit, an input information obtaining unit configured to obtain input information items sequentially sent from the terminal in response to an input information transmission instruction to the second server, a second executing unit configured to execute the application, and a second transmission unit configured to send a result of execution of the application by the second executing unit to the terminal.

10 Claims, 11 Drawing Sheets

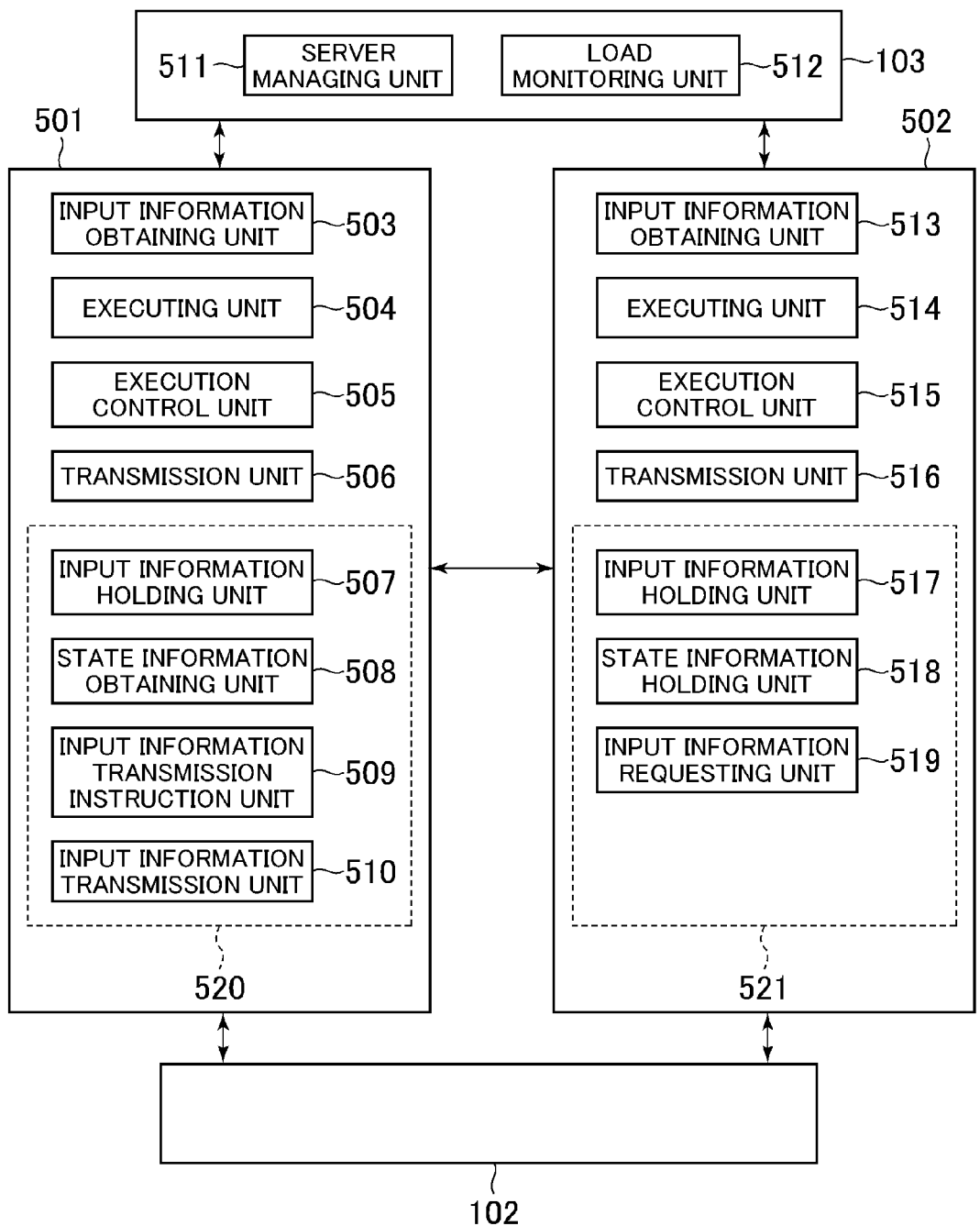

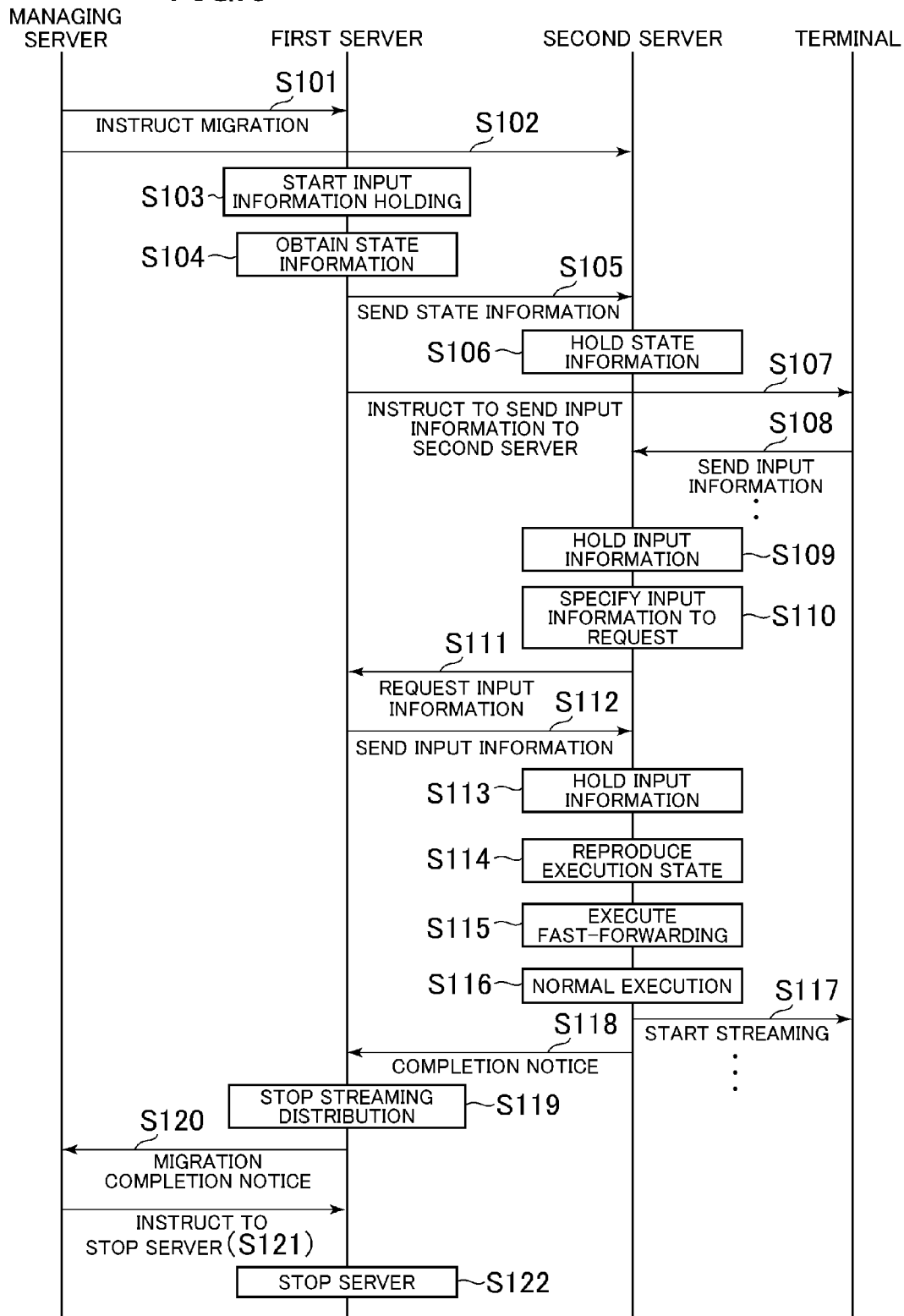

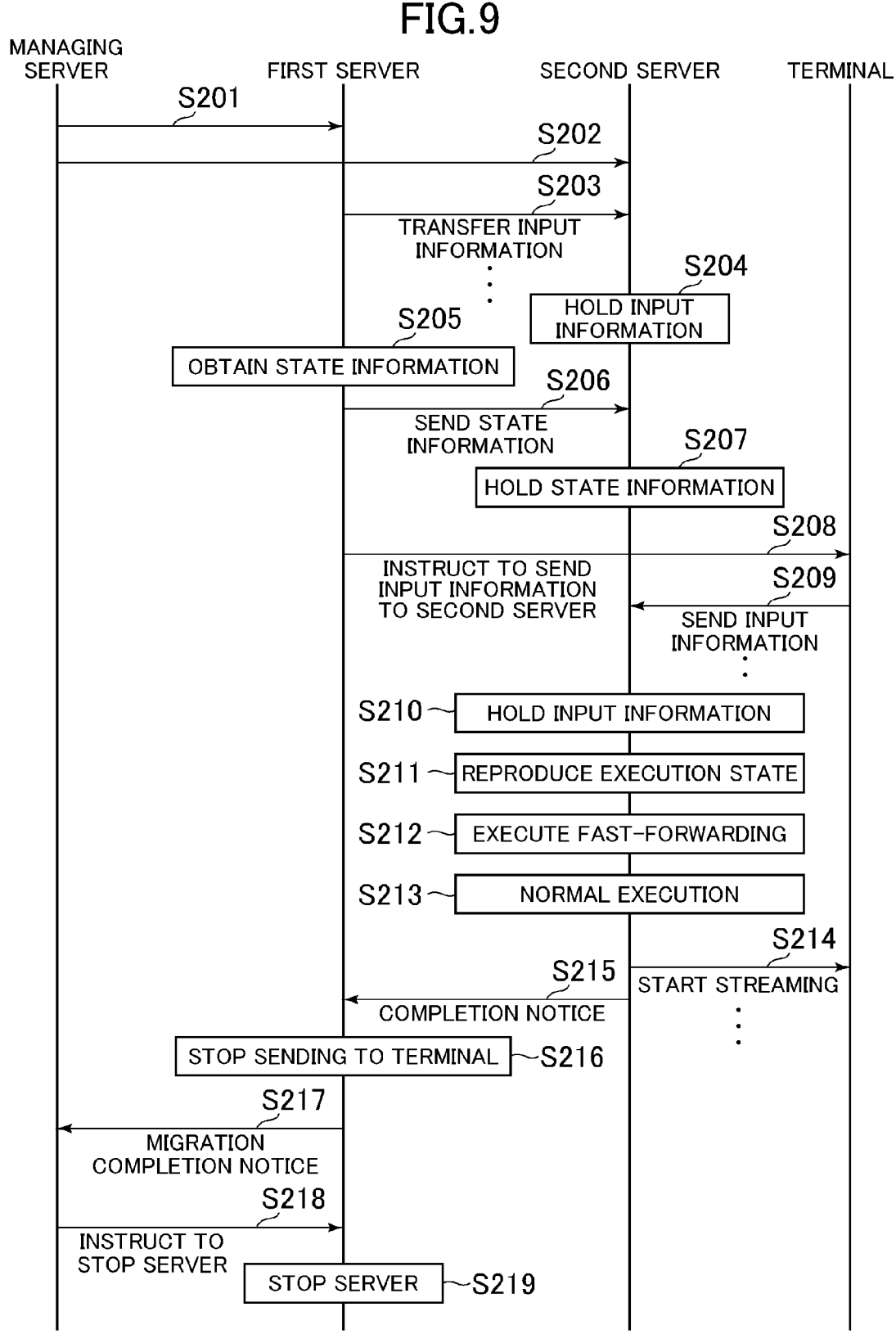

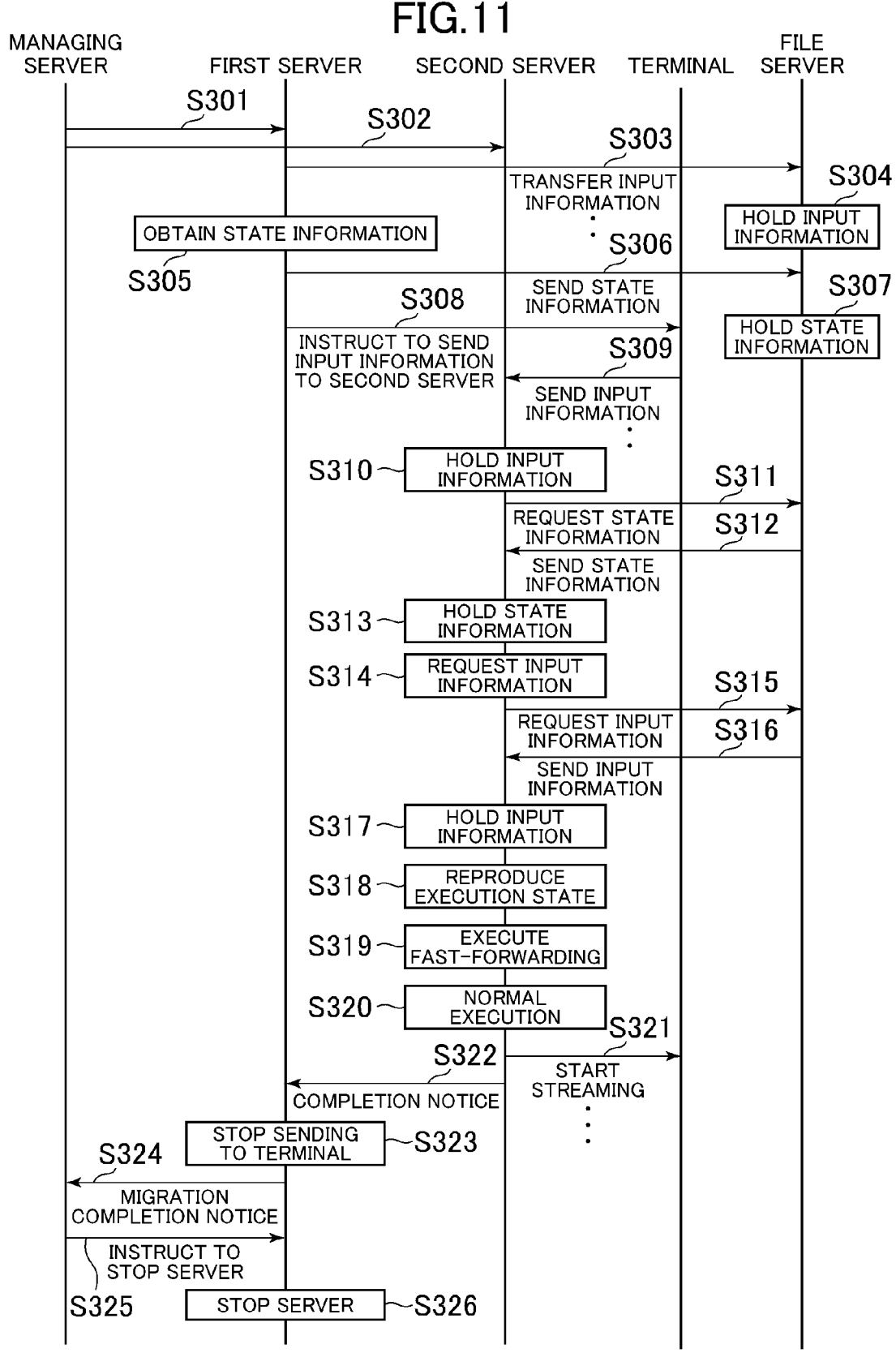

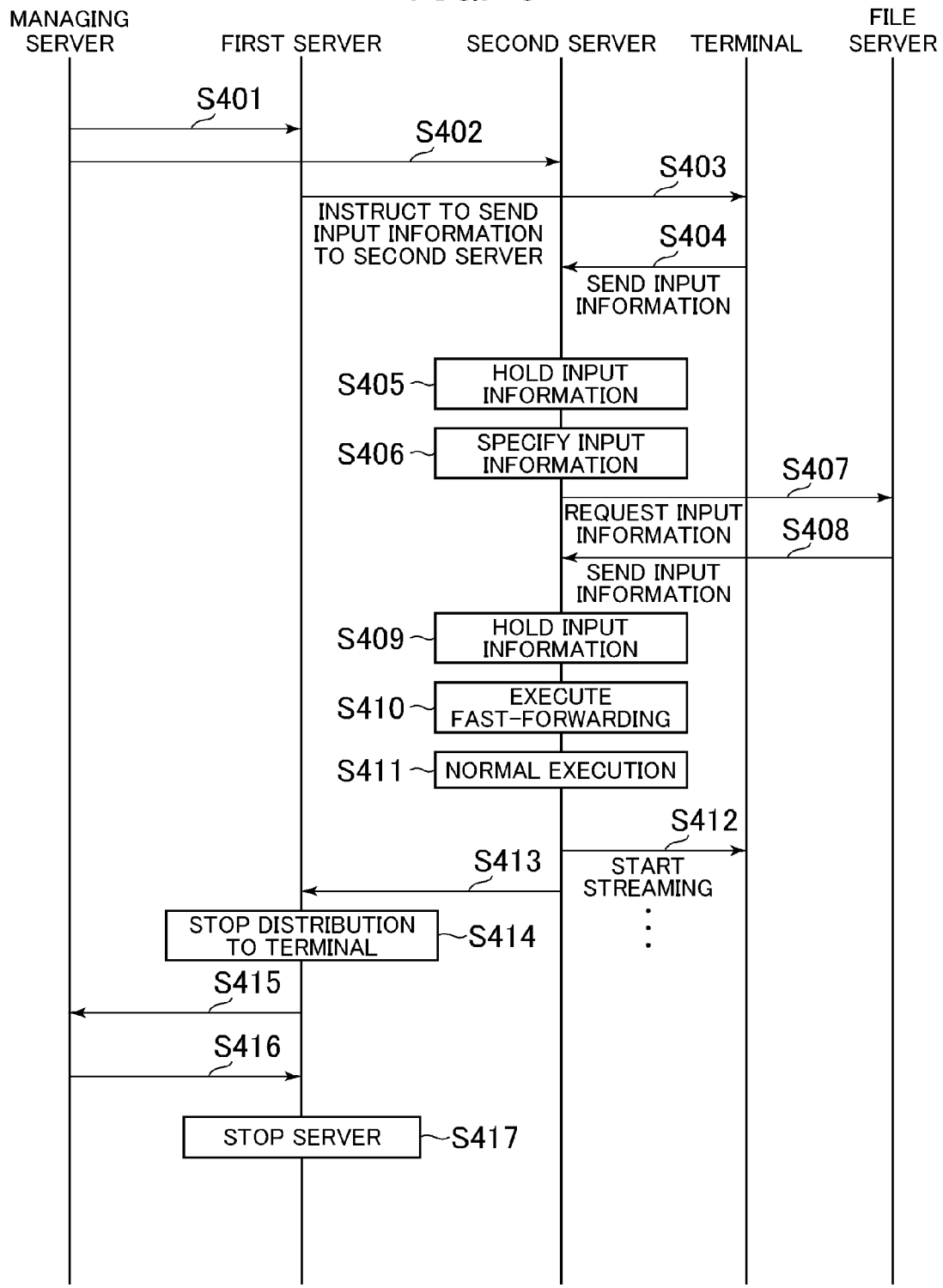

METHODS AND APPARATUS FOR ONLINE PROGRAM APPLICATION EXECUTION BETWEEN SERVERS

CROSS-REFERENCE TO RELATED APPLICATION

The present application claims priority from Japanese Application JP2011-263650 filed on Dec. 1, 2011, the content to which is hereby incorporated by reference into this application.

BACKGROUND OF THE INVENTION

1. Field of the Invention

The present invention relates to an information processing system, an information processing server, an information processing method, an information processing program, and a computer readable storage medium storing the information processing program.

2. Description of the Related Art

There is known a so-called on-line game in which a server is connected to a client via a network so that a game is played on-line.

SUMMARY OF THE INVENTION

The above described on-line game is implemented by, for example, reproducing in each game server a unit for executing a game corresponding to a game device (game executing unit) and sending a result of executing a game program by the game executing unit to respective terminals. In the above, there may be a case in which, for example, the number of terminals connected decreases, and a load on each server thus decreases. In such a case, it may be inefficient and result in higher cost as a whole system to maintain such a plurality of servers with a low load factor in an activated state.

One or more embodiments of the present invention has been conceived in view of the above, and an object thereof is to provide an information processing system, an information processing server, an information processing method, an information processing program, and a computer readable storage medium storing the information processing program capable of, for example, having a server to take over execution of a game being implemented in another server while having a user continuously playing a game.

(1) In one or more embodiments of the present invention, an information processing system includes a first server and a second server. The first server includes a first executing unit configured to execute an application at a first speed, using input information items sequentially obtained, and a first transmission unit configured to send a result of execution of the application to a terminal. The second server includes a reproduction data obtaining unit configured to obtain reproduction data containing the input information items sequentially obtained, for reproducing a state of the first executing unit, an input information obtaining unit configured to obtain input information items sequentially sent from the terminal in response to an input information transmission instruction to the second server, a second executing unit configured to execute the application, and a second transmission unit configured to send a result of execution of the application by the second executing unit to the terminal. The second executing unit executes the application at a second speed faster than the first speed, using at least the input information items sequentially obtained and contained in the reproduction data, so as to reproduce, in the second executing unit, the state of the first executing unit. The second executing unit, after reproducing the state of the first executing unit, executes the application at a speed corresponding to the first speed, using the input information items sequentially obtained by the second server. The first server, after the second executing unit starts sending the result of execution of the application to the terminal, stops sending the result of execution of the application to the terminal.

(2) In the information processing system according to (1), the reproduction data includes execution state information indicating a first execution state. The second executing unit further reproduces, in the second executing unit, the state of the first executing unit, using the execution state information.

(3) In the information processing system according to (1) or (2), the reproduction data obtaining unit obtains the reproduction data from the first server.

(4) In the information processing system according to (1), the reproduction data obtaining unit obtains a part of the reproduction data from a third server different from either the first server or the second server.

(5) In the information processing system according to one of (1) to (4), the second executing unit executes the application at the second speed faster than the first speed, using at least the input information items sequentially obtained and contained in the reproduction data, until execution of the application by the second executing unit using current input information from the terminal becomes possible, so as to reproduce, in the second executing unit, the state of the first executing unit.

(6) In the information processing system according to (5), the second executing unit executes the application at the speed corresponding to the first speed, using the input information items sequentially obtained by the input information obtaining unit included in the second server, after the execution becomes possible.

(7) In one or more embodiments of the present invention, an information processing method includes starting execution of an application at a first speed by a first executing unit included in a first server, using input information items sequentially obtained; starting, by the first server, sending a result of execution of the application to a terminal; obtaining, by a second server, reproduction data containing the input information items sequentially obtained to reproduce a state of the first executing unit; starting, by the second server, obtaining input information items sequentially sent from the terminal in response to an input information transmission instruction to the second server; executing the application by a second executing unit included in the second server at a second speed faster than the first speed, using at least the input information items sequentially obtained and contained in the reproduction data, ao as to reproduce, in the second executing unit, the state of the first executing unit; starting execution of the application by the second executing unit, after the state of the first executing unit is reproduced, at a speed corresponding to the first speed, using the input information items sequentially obtained by the second server; starting, by the second server, sending a result of execution of the application of the second executing unit to the terminal; and stopping, by the first server, sending the result of execution of the application to the terminal after starting sending the result of execution of the application of the second executing unit to the terminal.

(8) In one or more embodiments of the present invention, a computer readable storage medium for storing an information processing program for causing a computer to function as: a first server including; a first executing unit configured to execute an application at a first speed, using input information items sequentially obtained, and a first transmission unit configured to send a result of execution of the application to a terminal, and a second server including; a reproduction data obtaining unit configured to obtain reproduction data containing the input information items sequentially obtained, for reproducing a state of the first executing unit, an input information obtaining unit configured to obtain input information items sequentially sent from the terminal in response to an input information transmission instruction to the second server, a second executing unit configured to execute the application, and a second transmission unit configured to send a result of execution of the application by the second executing unit to the terminal. The second executing unit executes the application at a second speed faster than the first speed, using at least the input information items sequentially obtained and contained in the reproduction data, so as to reproduce, in the second executing unit, the state of the first executing unit. The second executing unit, after reproducing the state of the first executing unit, executes the application at a speed corresponding to the first speed, using the input information items sequentially obtained by the second server. The first server, after the second executing unit starts sending the result of execution of the application to the terminal, stops sending the result of execution of the application to the terminal.

(9) In one or more embodiments of the present invention, a first server includes a first executing unit configured to execute an application at a first speed, using input information items sequentially obtained; and a first transmission unit configured to send a result of execution of the application to a terminal. In a second server includes a reproduction data obtaining unit configured to obtain reproduction data containing the input information items sequentially obtained, for reproducing a state of the first executing unit, an input information obtaining unit configured to obtaining input information items sequentially sent from the terminal in response to an input information transmission instruction to the second server, a second executing unit configured to execute the application, and a second transmission unit configured to send a result of execution of the application by the second executing unit to the terminal. The second executing unit executes the application at a second speed faster than the first speed, using at least the input information items sequentially obtained and contained in the reproduction data, to reproduce in the second executing unit the state of the first executing unit, and after reproduction of the state of the first executing unit, executes the application at a speed corresponding to the first speed, using the input information items sequentially obtained by the second server. The first server, after the second executing unit starts sending the result of execution of the application to the terminal, stops sending the result of execution of the application to the terminal.

BRIEF DESCRIPTION OF THE DRAWINGS

FIG. 5 explains one example of a functional structure of the information processing system shown in FIG. 1;

FIG. 6 explains one example of a flow of processing of the information processing system shown in FIG. 1;

FIG. 9 explains a flow of processing of an information processing system according to the second embodiment;

FIG. 11 explains a flow of processing of an information processing system according to the third embodiment;

FIG. 13 explains a flow of processing of an information processing system according to the fourth embodiment.

DETAILED DESCRIPTION OF THE INVENTION

Figure 1:
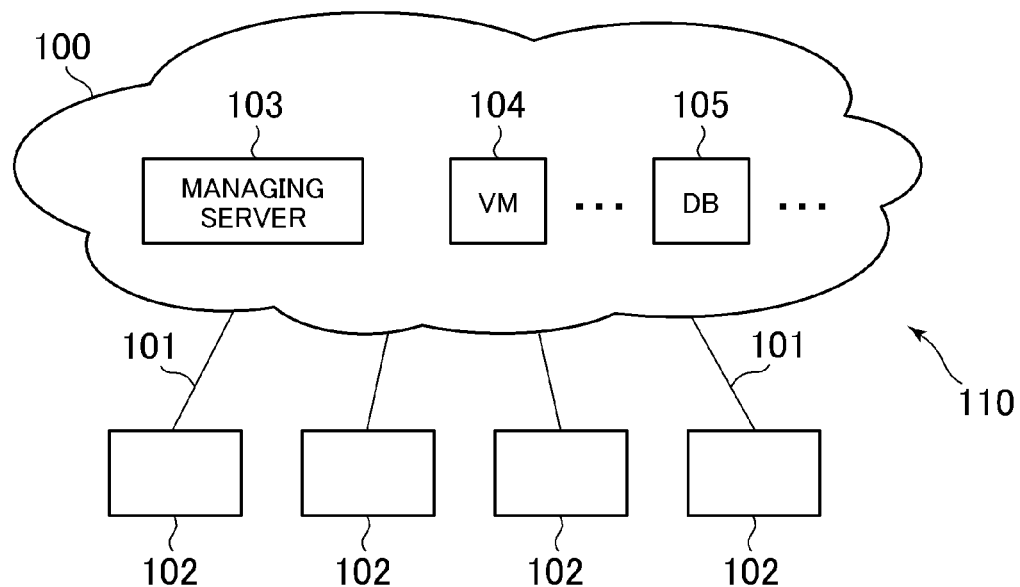
FIG. 1 explains one example of an information processing system according to a first embodiment.

In the following, embodiments of the present invention will be described with reference to the drawings. The same and equivalent elements in the drawings are given the same reference numerals, with duplicated descriptions omitted.

First Embodiment

FIG. 1 explains one example of an information processing system in an embodiment of the present invention. As shown in FIG. 1, the information processing system 110 in this embodiment includes a cloud base 100 and one or more terminals 102. The cloud base 100 and the terminal 102 are connected to each other via a network 101.

The cloud base 100 includes a managing server 103, one or more virtual servers (VM) 104 to be described later, and one or more databases (DB) 105. The cloud base 100 mentioned here refers to one manner of use of a computer based on a network 101, being a substrate for a user to use computer processing as a server via a network.

Figure 2:
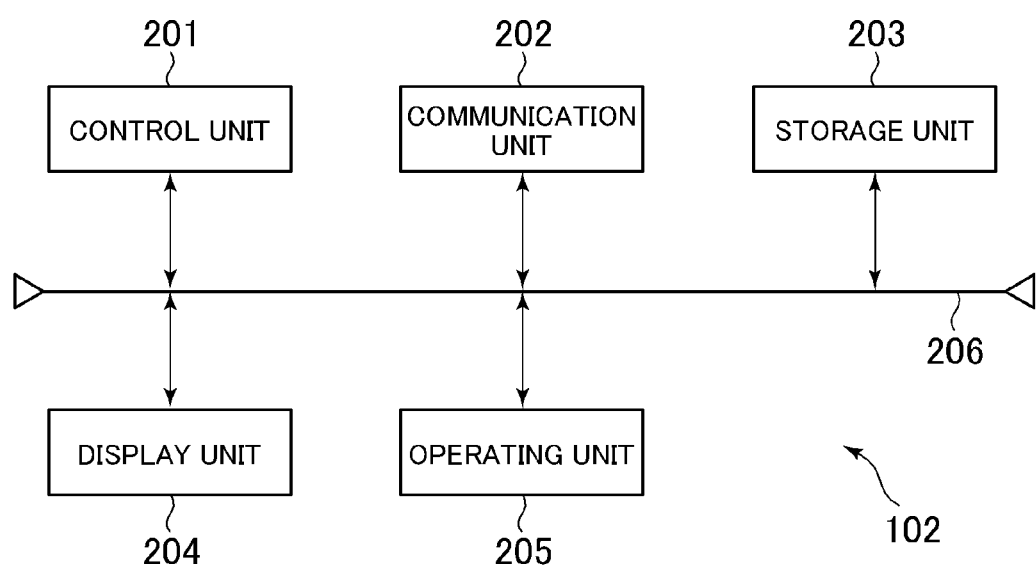
FIG. 2 explains one example of a structure of the terminal shown in FIG. 1.

As shown in FIG. 2, the terminal 102 includes a control unit 201, a communication unit 202, a storage unit 203, a display unit 204, and an operating unit 205. The respective units 201 to 205 are connected to one another via a bus 206. The control unit 201 is, e.g., a CPU, an MPU, or the like, and operates according to a program stored in the storage unit 203. The storage unit 203 includes, e.g., an information storage medium, such as a hard disk, a ROM, a RAM, or the like, for storing a program to be executed by the control unit 201. The storage unit 203 may operate also as a working memory of the control unit 201. A program to be executed by the control unit 201 may be provided by, for example, being downloaded via the network 101 or stored in various computer readable information storage media, such as a CD-ROM, a DVD-ROM, or the like.

The operating unit 205 includes an interface, such as, e.g., a keyboard, a mouse, a controller, a button, or the like, and in response to an instruction operation by a user, outputs the content of the instruction operation to the control unit 201.

The display unit 204 is, e.g., a liquid crystal display, a CRT display, an organic EL display, or the like, and shows information according to an instruction from the control unit 201. The operating unit 205 and the display unit 204 may respectively include a touch panel.

The above described structure of the terminal 102 is a mere example, and is not limiting. Specifically, the terminal 102 may include, e.g., a television, a smart phone, a tablet, or a personal computer, and the operating unit 205 may include a game pad or a remote controller of a television. The database 105 and the managing server 103 may include a control unit 201, communication unit 202, and storage unit 203 similar to those mentioned above, with a detailed explanation thereof omitted here.

Figure 3:
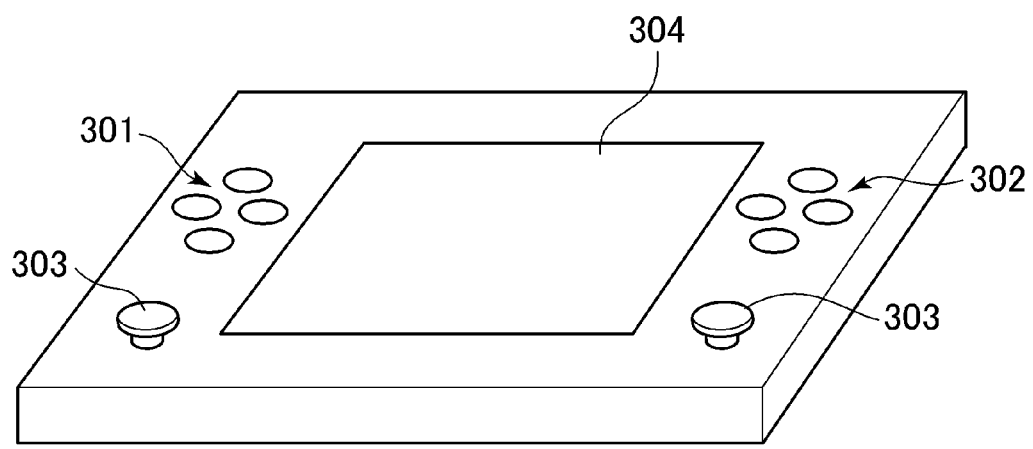
FIG. 3 shows one example of an external appearance of the terminal shown in FIG. 1.

FIG. 3 shows one example of an external appearance of the terminal. As shown in FIG. 3, the terminal 102 includes, e.g., a direction key 301, a plurality of buttons 302, and an analog operating unit 303 as the operating unit 205, and a display screen 304 as the display unit 204.

The direction key 301 includes, e.g., an up direction designation key, a down direction designation key, a right direction designation key, and a left direction designation key. Using the direction key 301, a user moves up, down, left, or right a target object shown on the screen image, for example. The plurality of buttons 302 respectively have, e.g., marks, such as a, b, c, d, and the like. By pressing these buttons 302, for example, a user can carry out processing that is allocated to a respective button according to an application being executed. The plurality of buttons 302 may be so-called analogue buttons for executing processing in a manner in accordance with the strength with which or a distance by which a user presses the respective buttons.

The analog operating unit 303 can incline from, e.g., a predetermined reference position, so that a user inputs information in accordance with the amount and direction of inclination of the analog operating unit 303 from the reference position. For example, using the analog operating unit 303, a user can incline a target object shown on the display screen 304 in his/her desired direction by his/her desired amount in accordance with the amount and direction of the inclination. The display screen 304 corresponds to the display screen 304 of the display unit 204, and shows, e.g., an image or the like according to an application.

The external appearance of the terminal 102 and the structures of the operating unit 205 and the display unit 204 shown in FIG. 3 are mere examples, and not limiting. That is, for example, the operating unit 205 may include a touch panel shown on the display unit 204, and the display unit 204 may include a display screen, such as a monitor, or the like, formed using a CRT or a liquid crystal display device. The numbers and shapes of the direction key 301, the plurality of buttons 302, and the analog operating unit 303 may be different from those described above, and the terminal 102 may have another button or an acceleration sensor, such as a start button, a select button (not shown), or the like.

Figure 4:
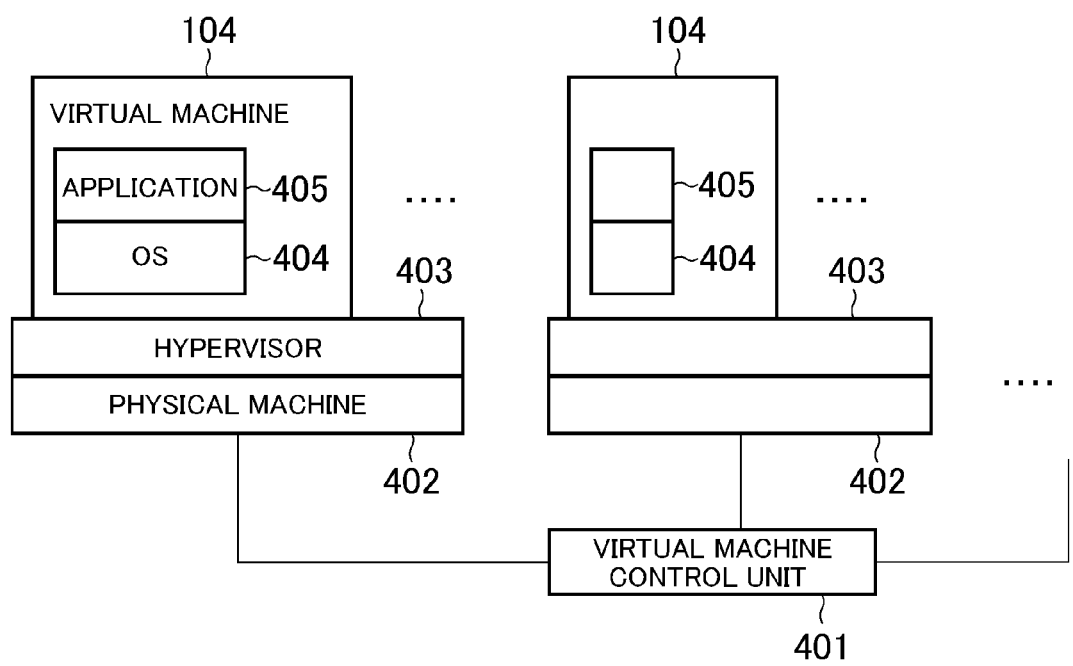
FIG. 4 explains a virtual server shown in FIG. 1.

FIG. 4 explains the virtual server shown in FIG. 1. As shown in FIG. 4, the cloud base 100 includes a virtual server control unit 401 and physical machines 402 connected to the virtual server control unit 401.

As shown in FIG. 4, each physical machine 402 has a hypervisor 403 provided thereto, and one or more virtual servers 104 are implemented on the hypervisor 403. The hypervisor 403 refers to software for implementing a virtual server 104 in each physical machine 402 without an aid by a general purpose OS and controlling the virtual server 104. The virtual server 104 corresponds to a set of a CPU and a memory that are virtually generated, as publicly known. Each physical machine 402 is a computer including a CPU, a memory, and the like.

Each virtual server 104 has an OS 404 and an application 405. A program to be executed by the virtual server 104 corresponds to one of the applications 405. The virtual server control unit 401 generates one or more virtual servers 104 in the physical machine 402 specifically by allocating a resource (e.g., resources such as a processing time of a CPU, memory capacity, and the like) of the physical machine 402 to the virtual server 104 via the hypervisor 403, and controlling the resources allocated.

That is, in actuality, installation and execution of a program in the virtual server 104, to be described below, is implemented in the physical machine 402. For example, a plurality of programs, including one in this embodiment, are stored in a storage unit formed using a memory or the like in the physical machine 402, and the program in this embodiment is actually executed by one or more CPUs of the physical machine 402. In the above, the one or more CPUs of the physical machine 402 is/are used also to execute the plurality of programs, and, for example, a part of a processing time of the one or more CPUs, resulting from dividing, is allocated to execute the program in this embodiment. The above described structure of the virtual server 104 or the like is a mere example, and not limiting.

It will be described below an example of a functional structure and a processing flow of the information processing system 110 in this embodiment, referring to FIGS. 5 and 6. FIG. 5 explains one example of a functional structure of the information processing system 110 in this embodiment. FIG. 6 explains one example of a flow of processing of the information processing system 110 in this embodiment.

As shown in FIG. 5, the information processing system 110 in this embodiment functionally includes the managing server 103, a first server 501, and a second server 502. The first server 501 and the second server 502 respectively correspond to, e.g., one of the plurality of virtual servers 104 shown in FIG. 1. Although two virtual servers 104 (the first server 501 and the second server 502) are shown in FIG. 5 and one game instance is implemented in each of the two virtual servers 104 for brevity of description, it may be possible to implement the number of virtual servers 104 in accordance with, e.g., the number of terminals 102 connected in the information processing system 110 and to implement any other number of game instances in each virtual server 104. A game instance corresponds to a function of one game device that is reproduced in a server.

It will be described below as an example, for brevity of description, an example of a functional structure and a flow of the information processing system 110 implemented in migration of a server process of the first server 501 to the second server 502. In the above described example, for example, migration unit implementation in the second server 502 of a game instance being implemented in the first server 501, and successive execution of a game program being executed in the first server 501. Specifically, a case will be described below as one example in which, when only one game instance is being implemented in the first server 501 and the CPU utilization ratio of the second server 502 allows implementation of the one game instance in the second server 502, the game instance being implemented in the first server 501 is successively implemented in the second server 502, and the game program being executed in the first server 501 is successively executed. Note here that there may be a case, depending on a load on a server, in which a game instance being implemented in the second server 502 is successively implemented in the first server 501 or even another case, one virtual server 104 (e.g., the first server 501 and the second virtual server 502) may have a functional structure to be described later, in particular, migration units, of the first and second servers 501, 502. Further, a part of the functional structure of the first and second servers 501, 502 may be implemented in another virtual server 104, the managing server 103, or another server, as to be described later.

A first input information obtaining unit 503 in the first server 501 sequentially obtains input information from a corresponding terminal 102 for every predetermined period of time. A corresponding terminal 102 here refers to a terminal 102 that is connected to a game instance being implemented in the first server 501. That is, specifically, the first input information obtaining unit 503 obtains, e.g., operation information on a character that is an operation target in a game program as input information, and a result of execution of a game program being executed in the game instance is distributed to the corresponding terminal 102. The result of execution includes, e.g., motion picture information in accordance with execution of a game program, and the terminal 102 shows the motion picture information on the display unit 204 of the terminal 102. The result of execution may be compressed by a compressing unit (not shown) before being sent to the terminal 102. In this case, the terminal 102 decompresses the compressed result of execution before showing on the display unit 204.

A first executing unit 504 executes a game program desired by a user using the corresponding terminal 102. That is, the first executing unit 504 executes processing based on the input information items sequentially obtained from the terminal 102 by the first input information obtaining unit 503 to thereby execute a game program. Specifically, for example, a character that is an operation target in the game program is moved or caused to act according to the input information items sequentially obtained. The first executing unit 504 corresponds to, e.g., an emulator or a simulator. For example, while the game program is stored in the DB 105, the first executing unit 504 obtains the game program from the DB 105 to execute a game program designated by a user.

A first transmission unit 506 sends a result of execution of the game program by the first executing unit 504 to the corresponding terminal 102. Specifically, for example, motion picture information and audio information based on execution of the game program are compressed before being sent via the network 101 to the corresponding terminal 102. That is, in this embodiment, before sending a migration instruction to be described below, the game program is executed in a game instance being implemented in the first server 501, for example, and a result of execution accompanying the execution of the game program is distributed to the terminal 102. That is, before a process accompanying migration starts, the game program is executed in the first server 501, and motion picture information and audio information accompanying the execution is distributed to the terminal 102, so that a user plays the game program.

It is mainly described below a process that accompanies migration and a functional structure and a flow of processing for implementing the process. The managing server 103 includes a server managing unit 511 and a load monitoring unit 512. The load monitoring unit 512 monitors a load on each virtual server 104 for every predetermined period of time (e.g., every 60 seconds). Specifically, for example, the load monitoring unit 512 monitors the CPU utilization ratio of each virtual server 104 and the state of network I/O (input/output) to monitor a load on each virtual server 104, and outputs load information indicating a load on the virtual server 104 to the server managing unit 511, to be described later.

Based on the load information from the load monitoring unit 512, the server managing unit 511 instructs migration between respective managing servers 103, to be described later, and manages activation and termination of the respective virtual servers 104. Specifically, in the above described example, the server managing unit 511 obtains load information from the load monitoring unit 512 describing that the CPU utilization ratio of the first server 501 is low as only one game instance is implemented in the first server 501 and that the CPU utilization ratio of the second server 502 allows implementation of the one game instance in the second server 502.

Here, based on the load information, the server managing unit 511 reproduces in the second server 502 the game instance being implemented in the first server 501, as shown in FIG. 6, and sends a migration instruction for successive execution to the first server 501 and the second server 502 (S101, S102). Although the migration instruction is first sent to the first server 501 (S101) and then to the second server 502 (S102) in FIG. 6, the migration instruction may be sent simultaneously to the first server 501 and the second server 502 or first to the second server 502 and then to the first server 501.

In response to the migration instruction from the managing server 103, a first input information holding unit 507 of the first server 501 starts holding the input information items sequentially obtained from the terminal 102 by the first input information obtaining unit 503 (S103). The input information includes, e.g., order information indicating an order in which the input information is obtained. Specifically, for example, in a case where the first input information obtaining unit 503 sequentially obtains input information items respectively containing order information items 1, 2, 3, 4, 5, and so forth, and a migration instruction is received between receipts of the order information items 4 and 5, the first input information holding unit 507 holds the input information items respectively containing order information items 5 and thereafter together with the order information items. That is, in this case, the first input information holding unit 507 sequentially holds the input information items respectively containing, e.g., order information items 5, 6, 7, and so forth.

Upon start of holding the input information by the first input information holding unit 507, a first state information obtaining unit 508 obtains state information describing a state of execution by the first executing unit 504 (S104). That is, in the above described example, the first state information obtaining unit 508 obtains state information that is available when processing is executed according to the input information containing order information 4. Then, the first state information obtaining unit 508 sends the obtained state information to the second server 502 together with the order information to be next input (the order information 5 in the above described example) (S105). A second state information holding unit 518 of the second server 502 holds the state information together with the order information (S106).

Note that the state information corresponds to state information (values of a memory, a register, a program counter or the like) of a game device that executes a reproduced game program in the first executing unit 504 or the second executing unit 514 formed using an emulator or a simulator. When a game device itself is mounted, state information corresponds to state information of the game device.

In response to the migration instruction, a first input information transmission instruction unit 509 sends the corresponding terminal 102 an input information transmission instruction for sending input information to the second server 502 as well (S107). In the above, the migration instruction includes, e.g., server identifying information for identifying the second server 502, and the input information transmission instruction includes server identifying information for identifying the second server 502. Having obtained the input information transmission instruction, the terminal 102 starts sending input information to a server identified by the server identification information (the second server 502 in the above described example) (S108). Specifically, in the above described example, the terminal 102 starts sending the input information items respectively containing, e.g., order information items 8 and thereafter, that is, order information items 8, 9, 10, and so forth, as some period of time has already passed before receipt of the input information transmission instruction.

A second input information holding unit 517 of the second server 502 starts holding the input information obtained from the terminal 102 in response to the input information transmission instruction from the first server 501 (S109). Specifically, in the above described example, the second input information holding unit 517 starts holding the input information items respectively containing order information items 8, 9, 10, and so forth.

An input information requesting unit 519 of the second server 502 specifies input information to request to the first server 501 (S110), and sends a request instruction for requesting the input information to the first server 501 (S111). In the above, for example, the order information held correlated to the state information held in the second state information holding unit 518 is compared with the order information held in the second input information holding unit 517 to specify input information not held in the second server 502, that is, lacking input information, and the lacking input information is requested. Specifically, in the above described example, while order information 5 is correlated to the state information and the order information items of the input information items held in the second input information holding unit 517 are 8, 9, 10, and so forth, input information items corresponding to order information items 5, 6, 7 are specified as input information items to request to the first server 501, and a request instruction for requesting those input information items is sent to the first server 501.

Based on the input information request instruction from the second server 502, a first input information transmission unit 510 of the first server 501 sends the input information held in the first input information holding unit 507 to the second server 502 (S112). Specifically, in the above described example, the input information items respectively containing order information items 5, 6, 7 are obtained from the first input information holding unit 507, and sent to the second server 502.

The second input information holding unit 517 of the second server 502 holds the requested input information sent from the first server 501 (S113). With the above, in the above described example, the second input information holding unit 517 can hold the input information items respectively containing an order information item correlated to the state information and subsequent order information items, namely, order information items 5, 6, 7 and so forth.

A second execution control unit 515 of the second server 502 reproduces, in the second executing unit 514, the state of execution of the first executing unit 504, using the state information held in the second state information holding unit 518 (S114), and then causes the second executing unit 514 to keep executing fast-forwarding using the input information held in the second input information holding unit 517 until it becomes possible to start execution of the game program using current input information from the terminal 102 (S115).

Note that execution of fast-forwarding unit, e.g., execution of a game program at a speed (a second executing speed) faster than a speed (a first executing speed) predetermined as an executing speed of the game program. Specifically, for example, the second executing unit 514 is caused to execute the game program at the fastest possible executing speed that can be achieved in the second executing unit 514 until it becomes possible to start execution of the game program using current input information, using the input information held in the second input information holding unit 517. In a case, for example, where fast-forwarding using the input information held in the second input information holding unit 517 ends in advance of a time for execution of the game program using current input information, the second executing unit 514 is stopped. Then, a time for execution by the second executing unit 514 at a normal speed (corresponding to the first executing speed) using the input information input from the terminal 102 is waited for before the second executing unit 514 is caused to execute the game program at the normal speed.

Note here that there is a case in which, for example, the executing speed of the first executing unit 504 or the second executing unit 514 is faster than that of a dedicated game device for executing a game program. In such a case, that is, for example, in a case where rending processing for each frame requires ⅟₆₀ second to complete, as frame rending processing is completed within ⅟₆₀ second, execution of processing by the first executing unit 504 or the second executing unit 514 is kept stopped until arrival of a time corresponding to subsequent ⅟₆₀ second timing, whereby a game program is executed at the normal speed. Further, in this case, fast-forwarding by the second executing unit 514 is achieved by not stopping the second executing processing, and when fast-forwarding using the input information held in the second input information holding unit 517 ends in advance of a time corresponding to ⅟₆₀ second timing, as described above, it may be arranged such that fast-forwarding by the second executing unit 514 is stopped, and the second executing unit 514 is thereafter execute processing at the normal speed for every ⅟₆₀ second.

Figure 7A:
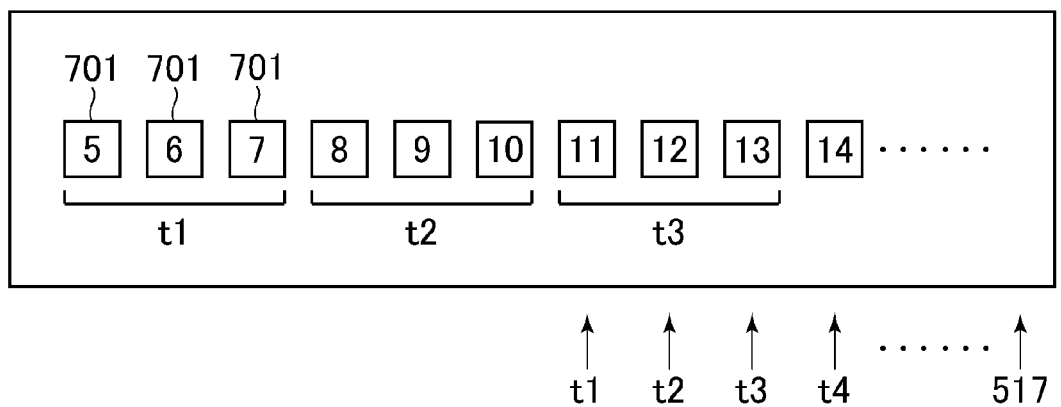
FIG. 7A explains one example of execution of fast-forwarding.
Figure 7B:
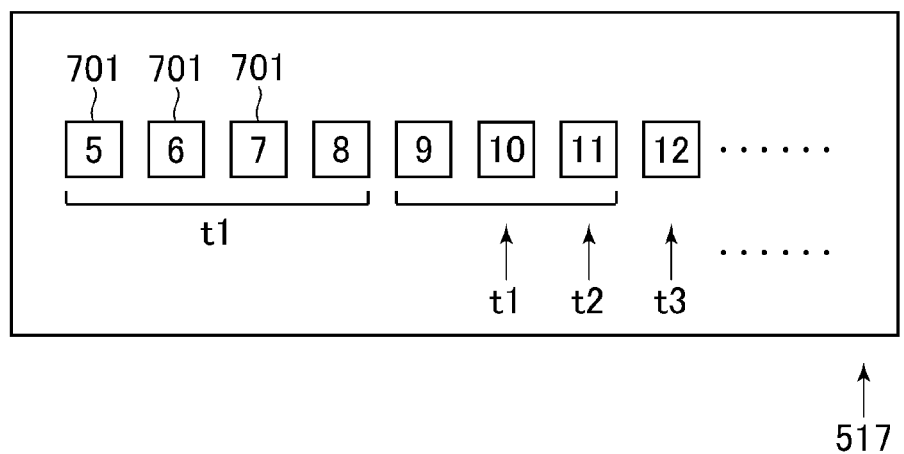
FIG. 7B explains another example of execution of fast-forwarding.

The second executing speed may correspond to a speed faster than the first executing speed over the entire fast-forwarding period of time, and include two or more speeds, such as, e.g., a three-time speed and a four-time speed. It will be described below a case shown in FIG. 7 as an example. FIG. 7 shows order information items of the input information items held in the second input information holding unit 517 in the above described example, in which the respective input information items 701 held in the second input information holding unit 517 are shown as numbers representative of order information items, and t1 to t2 or the like indicate times for the second input information holding unit 517 to hold respective input information items. FIG. 7A relates to fast-forwarding by inputting input information into the second executing unit 514 at a three-time speed, while FIG. 7B relates to fast-forwarding by inputting input information to the second executing unit 514 at a four-time speed.

As shown in FIG. 7A, input information items respectively containing order information items 11, 12, 13, 14 are held in the second input information holding unit 517 in the order of, e.g., times t1, t2, t3, t4. Initially, after start of execution of fast-forwarding, input information items respectively containing order information items 5, 6, 7 are input to the second executing unit 514 at time t1. Similarly, input information items respectively containing order information items 8 to 10 are input to the second executing unit 514 at time t2, and input information items respectively containing order information items 11 to 13 are input to the second executing unit 514 at time t3. At time t4, as the order information of the input information to be input is 14 and order information items 13 and therebefore have already been fast forwarded by then, the second executing unit 514 can execute at a normal speed (e.g., a speed predetermined as a play speed for the game program) at time t4 and thereafter using input information items (current input information) sequentially input from the terminal 102. Note that the input information items sequentially input from the terminal 102 are sequentially held in the second input information holding unit 517, as described above. The second execution control unit 515 keeps fast-forwarding the game program until it becomes possible to execute by the second executing unit 514 using current input information (corresponding to the input information containing order information 14 in the above described example), as described above.

Note here that, as shown in FIG. 7B, for example, there is a case in which n-time speed (n being a natural number equal to or larger than 2) cannot be always maintained in fast-forwarding. In such a case, the fast-forwarding speed needs to be adjusted in execution of fast-forwarding. Specifically, in FIG. 7B, for example, which is relevant to a four-time speed, as the input information containing order information 12 is not yet held at time t2, a four-time speed cannot be achieved at time t2. Thus, a three-time speed is employed at time t2, and the second executing unit 514 executes at the normal speed at time t3 and thereafter using the input information items (current input information) sequentially input from the terminal 102. Note that examples of the three-time speed and the four-time speed mentioned above are mere examples, and fast-forwarding may be executed at a different speed.

After it becomes possible to start execution of the game program using current input information from the terminal 102, that is, after completion of the fast-forwarding, the second execution control unit 515 causes the second executing unit 514 to execute the game program at a speed corresponding to the first speed (S116). In other words, the second executing unit 514 executes the game program at the normal speed. In the above, the second executing unit 514 executes processing in accordance with the input information items sequentially obtained from the terminal 102 by a second input information obtaining unit 513 to thereby execute the game program.

A second transmission unit 516 starts sending a result of execution by the second executing unit 514 to the terminal 102 (S117). In the above, as it is already possible at the time to start execution of the game program by the second executing unit 514 using current input information from the terminal 102, as described above, a result of execution by the second executing unit 514 using current input information is the same as a result of execution by the first executing unit 504 when influence attributable to communication, such as delay in network or the like between the terminal 102 and the first server 501 and between the terminal 102 and the second server 502 is excluded. Therefore, as the terminal 102 receives the same results of execution from the first executing unit 504 and from the second executing unit 514 at S117 and thereafter, a result of execution sent from the second server 502 is shown on the display unit 204, instead of that from the first server 501.

The second execution control unit 515 sends a completion notice notifying of completion of the process in the second server 502 to the first server 501 (S118). In response to the completion notice, a first execution control unit 505 stops sending by the first transmission unit 506 a result of execution by the first executing unit 504 (S119). In the above, the first execution control unit 505 may stop execution of the game program by the first executing unit 504 and holding of input information by the first input information holding unit 507. The first execution control unit 505 sends the managing server 103 a migration completion notice notifying of completion of the migration process between the first server 501 and the second server 502 at S101 to S119 in response to the migration instruction (S120). In response to the migration completion notice, the server managing unit 511 of the managing server 103 sends the first server 501 a server stop instruction for stopping the server (S121). In response to the server stop instruction, the first server 501 stops (S122).

According to this embodiment, in the information processing system 110, a plurality of units executing a game are realized in the respective game servers, the results of execution of a game is sent to the respective terminals 102. In the information processing system 110, when the number of users decreases and loads on the respective servers thus drop, it is possible, by implementing migration between servers, to prevent the plurality of servers with a low load from being kept activated to thereby increase the efficiency of the information processing system 110 as a whole and prevent increase of cost of the information processing system 110 as a whole. In addition, a user can continue playing the game without being aware of occurrence of migration between servers.

The present invention is not limited to the above described embodiment, and it is possible to substitute by a structure and a flow substantially the same as the structure and the flow of processing in the above described embodiment, those for producing the same effect, or those for achieving the same object. For example, although a structure has been described in the above that stops sending a result of execution by the first executing unit 504 before the server stops, it may be arranged so as to stop execution of the game program by the first executing unit 504 and sending of a result of the execution in response to stop of the server.

Second Embodiment

Figure 8A:
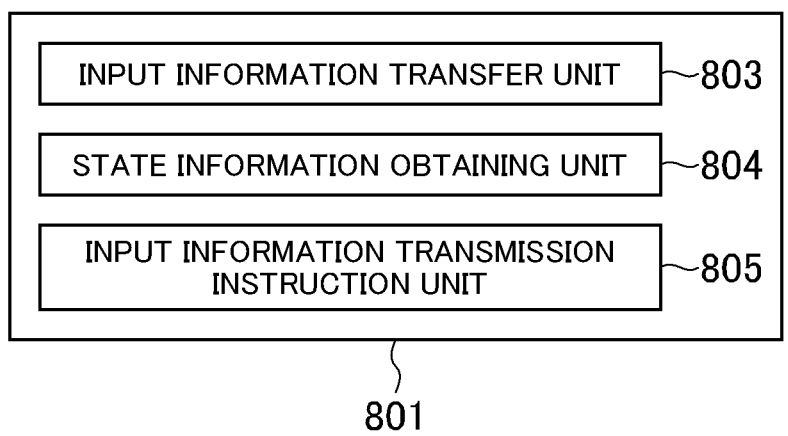
FIG. 8A explains one example of a functional structure of a first migration unit according to a second embodiment.
Figure 8B:
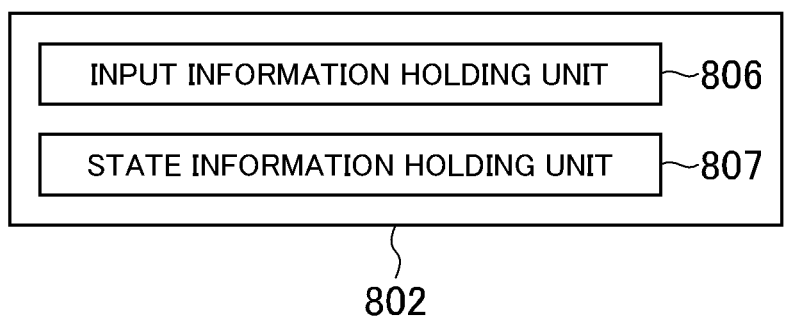
FIG. 8B explains one example of a functional structure of a second migration unit according to the second embodiment.

In the following, a second embodiment of the present invention will be described. As shown in FIGS. 8A and 8B, in this embodiment, functional structures of the first and second migration units 801, 802 of the first and second servers 501, 502 differ from those of the first and second migration units 520, 521 in the first embodiment, and transfer of first input information from the terminal 102 to the second server 502 also differs. In the following, difference from the first embodiment is mainly described, with similar points not described again. Further, similar to the first embodiment, it will be described below as an example, for brevity of description, an example of a functional structure and a flow of the information processing system 110 implemented in migration of a server process of the first server 501 to the second server 502.

Referring to FIGS. 8A, 8B, and 9, it will be described below a functional structure and a flow of processing of the information processing system 110 in this embodiment. FIG. 8A shows a functional structure of the first migration unit 801 of the first server 501 in this embodiment, and FIG. 8B shows a functional structure of the second migration unit 802 of the second server 502 in this embodiment. FIG. 9 explains a flow of processing of the information processing system 110 in this embodiment.

Similar to the first embodiment, the server managing unit 511 reproduces in the second server 502 the game instance being implemented in the first server 501, based on the load information from the load monitoring unit 512, and sends a migration instruction for successive execution to the first server 501 and the second server 502 (S201, S202).

In response to the migration instruction from the managing server 103, a first input information transfer unit 803 starts transferring the input information items sequentially obtained from the terminal 102 by the first input information obtaining unit 503 (S203). Specifically, for example, in a case where the first input information obtaining unit 503 sequentially obtains the input information items respectively containing order information items 1, 2, 3, 4, 5, and so forth, and a migration instruction is received between receipts of the order information items 4 and 5, the first input information transfer unit 803 transfers the input information items respectively containing order information items 5 and thereafter together with the order information items. That is, in this case, the first input information transfer unit 803 sequentially transfers the input information items respectively containing order information items 5, 6, 7, and so forth.

A second input information holding unit 806 of the second server 502 starts holding the input information items transferred from the first server 501 (S204). Specifically, in the above described example, the second input information holding unit 806 sequentially holds the input information items respectively containing order information items 5, 6, 7, and so forth.

For example, upon start of transferring the input information by the first input information transfer unit 803, a first state information obtaining unit 804 obtains state information describing a state of execution by the first executing unit 504 (S205). That is, in the above described example, the first state information obtaining unit 804 obtains state information that is available when processing is executed according to the input information corresponding to order information 4. Then, the first state information obtaining unit 804 sends the obtained state information to the second server 502 together with the order information to be next input (the order information 5 in the above described example) (S206). A second state information holding unit 807 of the second server 502 holds the state information together with the order information (S207).

In response to the migration instruction, a first input information transmission instruction unit 805 sends the corresponding terminal 102 an input information transmission instruction for sending input information to the second server 502 as well (S208). Having received the input information transmission instruction, the terminal 102 starts sending input information to a server identified by the server identification information (the second server 502 in this case) (S209). Specifically, in the above described example, the terminal 102 starts sending the input information items respectively containing, e.g., order information items 8 and thereafter, that is, order information items 8, 9, 10, and so forth, as some period of time has already passed before receipt of the input information transmission instruction.

The second input information holding unit 806 of the second server 502 starts holding the input information items sequentially obtained from the terminal 102 in response to the input information transmission instruction from the first server 501 (S210). Specifically, in the above described example, the input information items respectively containing order information items 8, 9, 10, and so forth are sequentially held. In the above, the input information holding unit 806 holds input information from the terminal 102, besides input information from the first server 501. In this case, as the second input information holding unit 806 resultantly holds duplicated input information items, it may be arranged such that duplicated input information item is not held, referring to the order information contained in the input information. Specifically, in the above described example, as respective input information items from the first server 501 (respectively containing, e.g., order information items 5, 6, 7, and so forth) and those from the terminal 102 (respectively containing, e.g., order information items 8, 9, 10, and so forth) are duplicated with each other as to the input information items corresponding to order information items 8 and thereafter. Therefore, as to the input information items corresponding to order information items 8 and therefore, the input information from the first server 501 may not be held, but the input information from the terminal 102 may be held. In this case, the first server 501 may be instructed to stop transferring the input information to the second server 502.

The second execution control unit 515 of the second server 502 reproduces, in the second executing unit 514, the state of execution of the first executing unit 504, using the state information held in the second state information holding unit 807 (S211), and then causes the second executing unit 514 to execute fast-forwarding using the input information held in the second input information holding unit 806 until it becomes possible to start execution of the game program using current input information sent from the terminal 102 (S212). Specifically, in the above described example, for example, the input information items corresponding to order information items 5 and thereafter are input to the second executing unit 514 at a speed faster than the normal input speed until it becomes possible to start execution of the game program using current input information, to thereby cause the second executing unit 514 to fast-forward the game program. Details on fast-forwarding or the like are the same as described above, and not explained here.

Then, similar to the first embodiment, after it becomes possible to start execution of the game program using current input information from the terminal 102, that is, after completion of the fast-forwarding, the second execution control unit 515 causes the second executing unit 514 to execute the game program at a speed corresponding to the first speed (S213). Therefore, the second transmission unit 516 starts sending a result of execution by the second executing unit 514 to the terminal 102 (S214). Then, the second execution control unit 515 sends a completion notice notifying of completion of the process in the second server 502 to the first server 501 (S215). In response to the completion notice, the first transmission unit 506 stops sending a result of execution by the first executing unit 504 (S216). In the above, it may be arranged so as to stop execution of the game program by the first executing unit 504 and holding of input information by the input information holding unit or the like as well.

The first execution control unit 505 sends the managing server 103 a migration completion notice notifying of completion of the migration process between the first server 501 and the second server 502 at 5203 to 5216 in response to the migration instruction (S217). In response to the migration completion notice, the server managing unit 511 of the managing server 103 sends the first server 501 a server stop instruction for stopping the server (S218). In response to the server stop instruction, the first server 501 stops (S219).

According to this embodiment, in the information processing system 110, a plurality of units executing a game are realized in the respective game servers, the results of execution of a game is sent to the respective terminals 102. In the information processing system 110, when the number of users decreases and loads on the respective servers thus drop, it is possible, by implementing migration between servers, to prevent the plurality of servers with a low load from being kept activated to thereby increase the efficiency of the information processing system 110 as a whole and prevent increase of cost of the information processing system 110 as a whole. In addition, a user can continue playing the game without being aware of occurrence of migration between servers.

The present invention is not limited to the above described embodiment, and it is possible to substitute by a structure and a flow substantially same as the structure and the flow of processing in the above described embodiment, those for producing the same effect, or those for achieving the same object. For example, although a structure has been described in the above that stops sending a result of execution by the first executing unit 504 before the server stops, it may be arranged so as to stop execution of the game program by the first executing unit 504 and sending of a result of the execution in response to stop of the server.

Third Embodiment

In the following, a third embodiment of the present invention will be described. In this embodiment, mainly, functional structures of the first and second migration units 111, 112 of the first and second servers 501, 502, use of a file server 113, and transfer of first input information and state information from the terminal 102 to the file server 113 differ from the first and second embodiments. In the following, difference from the first and second embodiments is mainly described, with similar points not described again. The file server 113 is, e.g., one server provided to the cloud base 100 shown in FIG. 1, and may be the virtual server 104 or a normal server. Further, similar to the first embodiment, It will be described below as an example, for brevity of description, an example of a functional structure and a flow of processing of the information processing system 110 implemented in migration of a server process of the first server 501 to the second server 502.

Figure 10A:
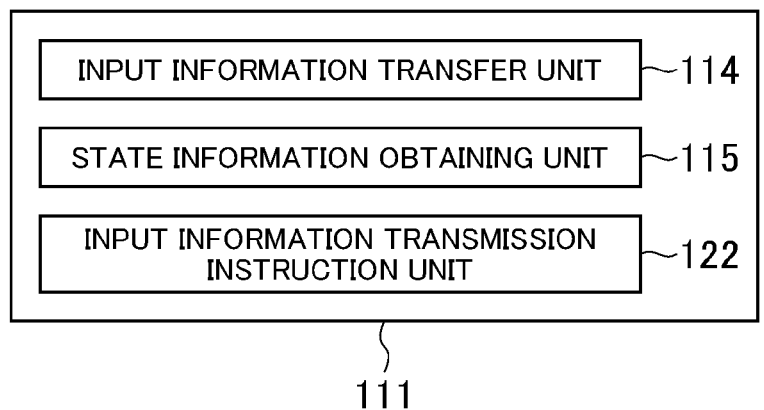
FIG. 10A explains one example of a functional structure of a first migration unit according to a third embodiment.
Figure 10B:
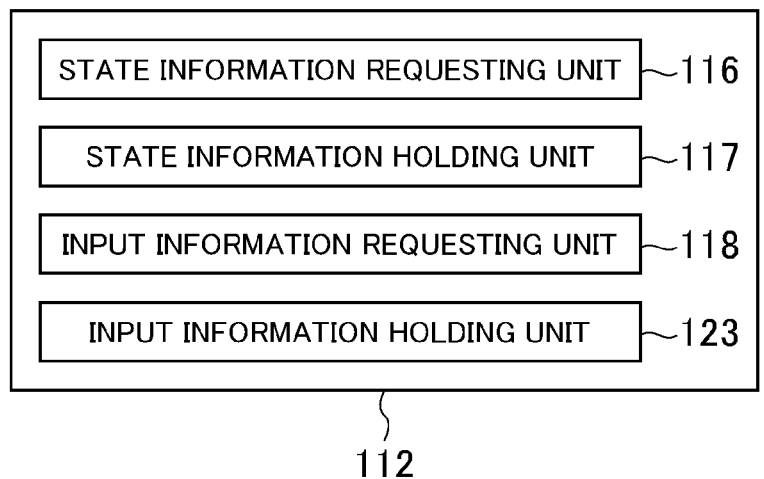
FIG. 10B explains one example of a functional structure of a second migration unit according to the third embodiment.
Figure 10C:
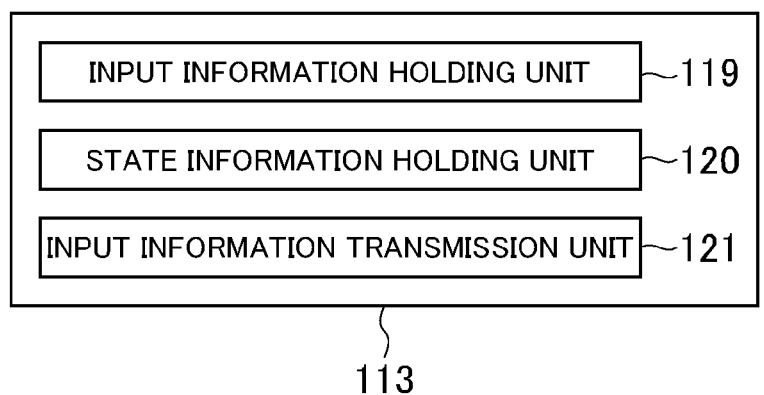
FIG. 10C explains one example of a functional structure of a file server according to the third embodiment.

Referring to FIGS. 10A to 10C and FIG. 11, it will be described below a functional structure and a flow of processing of the information processing system 110 in this embodiment. FIG. 10A shows a functional structure of a first migration unit 111 of the first server 501 in this embodiment, and FIG. 10B shows a functional structure of a second migration unit 112 of the second server 502 in this embodiment. FIG. 10C shows a functional structure of the file server 113 in this embodiment. FIG. 11 explains a flow of processing of the information processing system 110 in this embodiment.

Similar to the first embodiment, the server managing unit 511 reproduces in the second server 502 the game instance being implemented in the first server 501, based on the load information from the load monitoring unit 512, and sends the first server 501 and the second server 502 a migration instruction for successive execution of the game program being executed in the first server 501 (S301, S302).

In response to the migration instruction from the managing server 103, a first input information transfer unit 114 starts transferring the input information items sequentially obtained from the terminal 102 by the first input information obtaining unit 503 to the file server 113 (S303). Specifically, for example, in a case where the first input information obtaining unit 503 sequentially obtains the input information items respectively containing order information items 1, 2, 3, 4, 5, and so forth, and a migration instruction is received between receipts of the order information items 4 and 5, the input information transfer unit 114 first transfers the input information items respectively containing order information items 5 and thereafter to the file server 113. That is, in this case, the input information transfer unit 114 transfers the input information items respectively containing order information items 5, 6, 7, and so forth to the file server 113. An input information holding unit 119 of the file server 113 starts holding the input information items sequentially transferred from the first server 501 (S304). Specifically, in the above described example, the input information items respectively containing order information items 5, 6, 7, and so forth are sequentially held.

For example, upon start of transferring the input information by the first input information transfer unit 114, a first state information obtaining unit 115 of the first server 501 obtains state information describing a state of execution by the first executing unit 504 (S305). Specifically, in the above described example, the first state information obtaining unit 115 obtains state information that is available when processing is executed according to the input information corresponding to order information 4. Then, the first state information obtaining unit 115 sends the obtained state information to the file server 113 together with the order information to be next input (the order information 5 in the above described example) (S306). A state information holding unit 120 of the file server 113 holds the state information together with the order information (S307).

In response to the migration instruction, a first input information transmission instruction unit 122 sends the corresponding terminal 102 an input information transmission instruction for sending input information to the second server 502 as well (S308). Having received the input information transmission instruction, the terminal 102 starts sending input information to a server identified by the server identification information (the second server 502 in this case) (S309). Specifically, in the above described example, the terminal 102 starts sending the input information items respectively containing, e.g., order information items 8 and thereafter, that is, order information items 8, 9, 10, and so forth, as some period of time has already passed before receipt of the input information transmission instruction.

A second input information holding unit 123 of the second server 502 starts holding the input information obtained from the terminal 102 in response to the input information transmission instruction from the first server 501 (S310). Specifically, in the above described example, the input information items respectively containing order information items 8, 9, 10, and so forth are sequentially held. An input information requesting unit 118 of the second server 502 requests the file server 113 to send state information (S311). In response to the state information request, the file server 113 sends the state information held in the state information holding unit 120 of the file server 113 to the second server 502 (S312). A state information holding unit 117 of the second server 502 holds the state information from the second server 502 (S313).

The input information requesting unit 118 of the second server 502 specifies input information to request to the file server 113 (S314) and sends a request instruction for requesting the input information to the file server 113 (S315). Specifically, in the above, the input information requesting unit 118 of the second server 502 compares, e.g., the order information held correlated to the state information held in the second state information holding unit 807 and the order information held in the second input information holding unit 123 to thereby specify input information not held in the second server 502, that is, lacking input information, and requests the lacking input information. Specifically, in the above described example, while order information 5 is correlated to the state information and the order information items held in the second input information holding unit 123 are 8, 9, 10, and so forth, the input information corresponding to order information items 5, 6, 7 are specified as input information items to request to the file server 113, and a request instruction for requesting those input information items is sent to the file server 113.

In response to the input information request instruction from the second server 502, an input information transmission unit 121 of the file server 113 sends the input information held in the input information holding unit 119 of the file server 113 to the second server 502 (S316). Specifically, in the above described example, the input information items respectively containing order information items 5, 6, 7 are obtained from the input information holding unit of the file server 113, and sent to the second server 502.

The second input information holding unit 123 of the second server 502 holds the requested input information sent from the first server 501 (S317). With the above, the second input information holding unit 123 can hold the input information items from an input information item containing order information correlated to the state information to a current input information item, that is, the input information items respectively containing order information items 5, 6, 7, and so forth, in the above described example.

The second execution control unit 515 of the second server 502 obtains the state information held in the second state information holding unit 807, and reproduces, in the second executing unit 514, the state of execution of the first executing unit 504, using the state information (S318). Then, the second execution control unit 515 causes the second executing unit 514 to execute fast-forwarding using the input information held in the second input information holding unit 123 until it becomes possible to start execution of the game program using current input information sent from the terminal 102 (S319). Specifically, in the above described example, for example, the input information items respectively corresponding to order information items 5 and thereafter are input to the second executing unit 514 at a speed faster than the normal input speed until it becomes possible to start execution of the game program using current input information, to thereby cause the second executing unit 514 to fast-forward the game program. Details on fast-forwarding or the like are the same as described above, and not explained here.

After it becomes possible to start execution of the game program using current input information from the terminal 102, that is, after completion of the fast-forwarding, the second execution control unit 515 causes the second executing unit 514 to execute the game program at a speed corresponding to the first speed (S320). The second transmission unit 516 starts sending a result of execution by the second executing unit 514 to the terminal 102 (S213). The second execution control unit 515 sends a completion notice notifying of completion of the process in the second server 502 to the first server 501 (S215). In response to the completion notice, the first transmission unit 506 stops sending a result of execution by the first executing unit 504 (S323). In the above, it may be arranged so as to stop execution of the game program by the first executing unit 504 and holding of input information by the input information holding unit or the like as well.

The first execution control unit 505 sends the managing server 103 a migration completion notice notifying of completion of the migration process between the first server 501 and the second server 502 at 5303 to 5323 in response to the migration instruction (S324). In response to the migration completion notice, the server managing unit 511 of the managing server 103 sends a server stop instruction for stopping the server to the first server 501 (S325). In response to the server stop instruction, the first server 501 stops (S326).

According to this embodiment, in the information processing system 110, a plurality of units executing a game are realized in the respective game servers, the results of execution of a game is sent to the respective terminals 102. In the information processing system 110, when the number of users decreases and loads on the respective servers thus drop, it is possible, by implementing migration between servers, to prevent the plurality of servers with a low load from being kept activated to thereby increase the efficiency of the information processing system 110 as a whole and prevent increase of cost of the information processing system 110 as a whole. In addition, a user can continue playing the game without being aware of occurrence of migration between the virtual servers 104.

The present invention is not limited to the above described embodiment, and it is possible to substitute by a structure and a flow substantially same as the structure and the flow of processing in the above described embodiment, those for producing the same effect, or those for achieving the same object. For example, although a structure has been described in the above that stops sending a result of execution by the first executing unit 504 before the server stops, it may be arranged so as to stop execution by the first executing unit 504 and sending of a result of the execution in response to stop of the server.

Fourth Embodiment

In the following, a fourth embodiment of the present invention will be described. In this embodiment, mainly, difference from the third embodiment lies in that state information is not obtained or held and that input information from the beginning of execution of the game program is held in the file server 133. Specifically, mainly, functional structures of the first and second migration units 131, 132 and that of the file server 133 differ from those in the third embodiment. In the following, mainly, difference from the first to third embodiments is described, with similar points not described again. Further, similar to the first embodiment, it will be described below as an example, for brevity of description, an example of a functional structure and a flow of the information processing system 110 implemented in migration of a server process of the first server 501 to the second server 502.

Figure 12A:
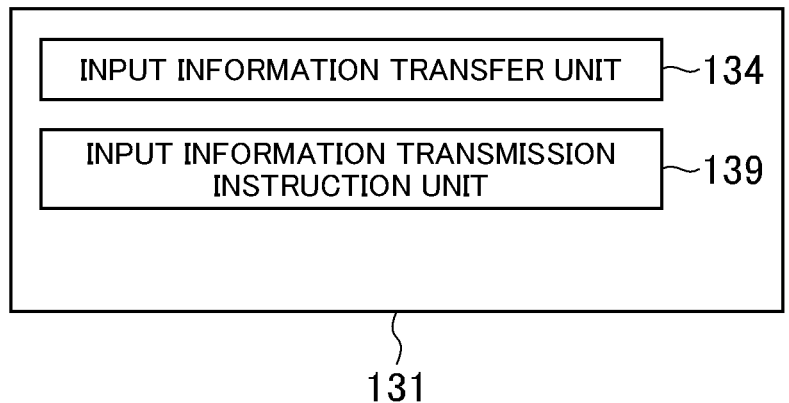
FIG. 12A explains one example of a functional structure of a first migration unit according to a fourth embodiment.
Figure 12B:
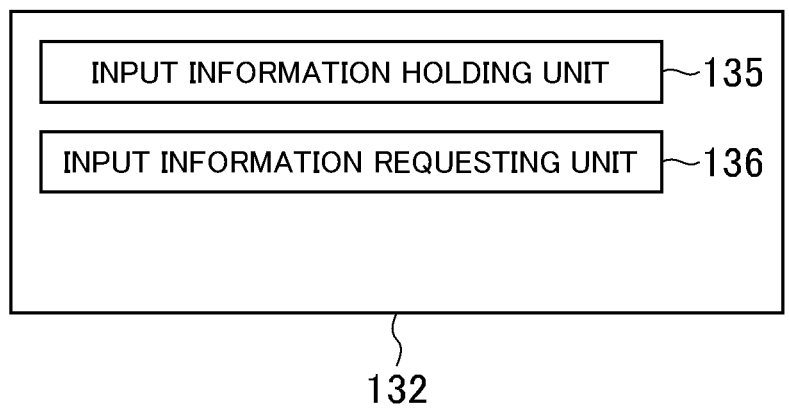
FIG. 12B explains one example of a functional structure of a second migration unit according to the fourth embodiment.
Figure 12C:
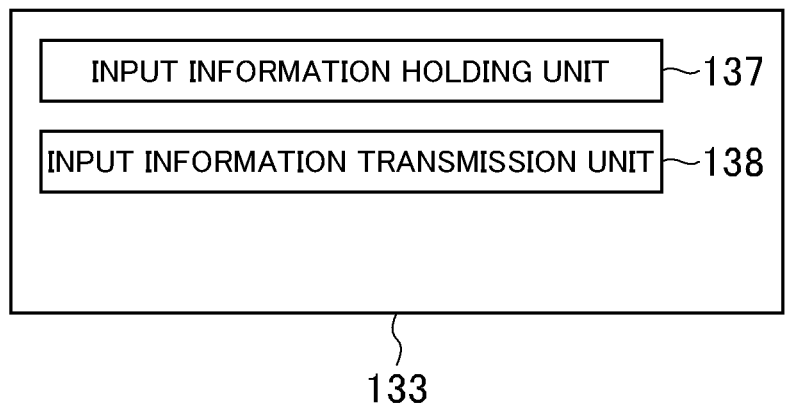
FIG. 12C explains one example of a functional structure of a file server according to the fourth embodiment.

Referring to FIGS. 12A to 12C and FIG. 13, it will be described below a functional structure and a flow of processing of the information processing system 110 in this embodiment. FIG. 12A shows a functional structure of a first migration unit 131 of the first server 501 in this embodiment, and FIG. 12B shows a functional structure of a second migration unit 132 of the second server 502 in this embodiment. FIG. 12C shows a functional structure of a file server 133 in this embodiment. FIG. 13 explains a flow of processing of the information processing system 110 in this embodiment. In this embodiment, as shown in FIG. 12A, the first server 501 has an input information transfer unit 134 for sequentially transferring to an input information holding unit 137 of the file server 133 the input information items sequentially obtained from the terminal 102 from the beginning of execution of the game program. Therefore, the input information holding unit 137 of the file server 133 holds the input information items from the beginning of the game program, that is, the input information items respectively containing, e.g., order information items, 0, 1, 2, and so forth (in a case where the order information begins with 0).

Similar to the first embodiment, the server managing unit 511 reproduces in the second server 502 the game instance being implemented in the first server 501, based on the load information from the load monitoring unit 512, and sends the first server 501 and the second server 502 a migration instruction for successive execution in the second server 502 of the game program being executed (S401, S402).

In response to the migration instruction, a first input information transmission instruction unit 139 sends the corresponding terminal 102 an input information transmission instruction for sending input information to the second server 502 as well (S403). Having obtained the input information transmission instruction, the terminal 102 starts sending input information to a server identified by the server identification information (the second server 502 in this case) (S404). Specifically, in the above described example, the terminal 102 starts sending the input information items respectively containing, e.g., order information items 8 and thereafter, that is, order information items 8, 9, 10, and so forth, as some period of time has already passed before receipt of the input information transmission instruction. The second input information holding units 137 starts holding the input information obtained from the terminal 102 according to the input information transmission instruction from the first server 501 (S405). Specifically, in the above described example, input information items respectively containing order information items 8, 9, 10, and so forth, are sequentially obtained.

An input information requesting unit 136 of the second server 502 specifies input information to request to the file server 133 (S406), and sends a request instruction for requesting the input information to the file server 133 (S407). In the above, the input information requesting unit 136 of the second server 502 specifies, e.g., input information item that is lacking among the order information items held in a second input information holding unit 135, and requests the lacking input information item. Specifically, in the above described example, while the order information items held in the second input information holding unit 135 are 8, 9, 10, and so forth, the input information items respectively containing order information items 7 and therebefore, that is, the input information items respectively containing order information items 0 to 7, are specified as input information items to request to the file server 133, and a request instruction for requesting those input information items is sent to the file server 133.

Based on the input information request instruction from the second server 502, an input information transmission unit 138 of the file server 133 sends the input information held in the input information holding unit 137 of the file server 133 to the second server 502 (S408), Specifically, in the above described example, the input information items respectively containing order information items 0 to 7 are obtained from the input information holding unit 137 of the file server 133, and sent to the second server 502.

The second input information holding unit 135 of the second server 502 holds the requested input information sent from the first server 501 (S409). With the above, the second input information holding unit 517 holds the input information items from an input information item containing an order information item at the beginning of the game program to a current input information item, namely, the order information items 0, 1, 2, and so forth, in the above described example.

The second execution control unit 515 causes the second executing unit 514 to execute fast-forwarding, using the input information held in the second input information holding unit 135, until it becomes possible to start execution of the game program using current input information from the terminal 102 (S410). Specifically, in the above described example, input information items respectively containing order information items at the beginning of execution of the game program (order information 0) and thereafter are input to the second executing unit 514 at a speed faster than the normal input speed until it becomes possible to start execution of the game program using current input information becomes possible, to thereby cause the second executing unit 514 to fast-forward the game program. Although state information is not used in this embodiment, differing from the first to third embodiments, as the input information items from an input information item at the beginning of the game program to a current input information item are all held, it is possible to reproduce the state of execution by the first executing unit 504 through fast-forwarding in the second executing unit 514.

After it becomes possible to start execution of the game program using current input information from the terminal 102, that is, after termination of the fast-forwarding, the second execution control unit 515 causes the second executing unit 514 to execute the game program at a speed corresponding to the first speed (S411). The second transmission unit 516 starts sending a result of execution by the second executing unit 514 to the terminal 102 (S412).

The second execution control unit 515 sends a completion notice notifying of completion of the process in the second server 502 to the first server 501 (S418). In response to the completion notice, the first transmission unit 506 stops sending a result of execution by the first executing unit 504 (S414). In the above, it may be arranged so as to stop execution of the game program by the first executing unit 504 and holding of input information by the first input information holding unit 137 as well.

The first execution control unit 505 sends the managing server 103 a migration completion notice notifying of completion of the migration process between the first server 501 and the second server 502 at S403 to S414 in response to a migration instruction (S415). In response to the migration completion notice, the server managing unit 511 of the managing server 103 sends a server stop instruction for stopping the server to the first server 501 (S416). In response to the server stop instruction, the first server 501 stops (S417).

According to this embodiment, in the information processing system 110, a plurality of units executing a game are realized in the respective game servers, the results of execution of a game is sent to the respective terminals 102. In the information processing system 110, when the number of users decreases and loads on the respective servers thus drop, it is possible, by implementing migration between servers, to prevent the plurality of servers with a low load from being kept activated to thereby increase the efficiency of the information processing system 110 as a whole and prevent increase of cost of the information processing system 110 as a whole. In addition, a user can continue playing the game without being aware of occurrence of migration between servers.

The present invention is not limited to the first to fourth embodiments, and it is possible to substitute by a structure and a flow substantially the same as the structure and the flow of processing in the above described embodiment, those for producing the same effect, or those for achieving the same object. For example, although a structure has been described in the above that stops sending a result of execution by the first executing unit 504 before the server stops, it may be arranged so as to stop execution of the game program by the first executing unit 504 and sending of a result of the execution in response to stop of the server. The game program executed in the first server 501 and the second server 502 may be a part (a mini game) of the game program, that is, a predetermined stage or a match against a predetermined opponent character. In this case, for example, the executing unit can execute the game program, using pre-stored state information on the executing units 504, 514 at the beginning of a mini game, to thereby begin the mini game. As to an end of the mini game, for example, the image of a part (e.g., the letters of goal, WIN, or the like) of image information items sequentially generated through execution of the game program may be recognized to thereupon determine the end of the mini game. Although a case using a so-called virtual server is described in the above, the present invention may be applied to a normal server-client system. Further, although it has been mainly described in the above a functional structure and a flow of processing of the information processing system 110 implemented in migration of a server process of the first server 501 to the second server 502, it may be arranged such that a server process of the second server 502 is migrated to the first server 501 or a server process may be migrated bi-directionally. The migration is not limited to one between the first server 501 and the second server 502, and may be one between the first or second server 501, 502 and another virtual server 104, between other virtual servers 104, or between the virtual server 104 and a normal server. Although a user is not aware of occurrence of migration in the above, it may be arranged such that a user is notified of occurrence of migration. Although the first server 501 and the second server 502 obtain input information from the terminal 102, execute the game program, and compress and send generated motion picture information in the above, it may be arranged such that a server different from either the first server 501 or the second server 502 may obtain input information and compress a motion picture or the like.

What is claimed is:

1. An information processing system comprising:
    a first server including;
    a first executing unit configured to execute an application at a first speed, using input information items sequentially obtained, and
    a first transmission unit configured to send a result of execution of the application to a terminal, and
    a second server including;
    a reproduction data obtaining unit configured to obtain reproduction data containing the input information items sequentially obtained, for reproducing a state of the first executing unit,
    an input information obtaining unit configured to obtain input information items sequentially sent from the terminal in response to an input information transmission instruction to the second server,
    a second executing unit configured to execute the application, and
    a second transmission unit configured to send a result of execution of the application by the second executing unit to the terminal,
    wherein the second executing unit executes the application at a second speed faster than the first speed, using at least the input information items sequentially obtained and contained in the reproduction data, so as to reproduce, in the second executing unit, the state of the first executing unit,
    wherein the second executing unit, after reproducing the state of the first executing unit, executes the application at a speed corresponding to the first speed, using the input information items sequentially obtained by the second server, and,
    wherein the first server, after the second executing unit starts sending the result of execution of the application to the terminal, stops sending the result of execution of the application to the terminal.

2. The information processing system according to claim 1, wherein
    the reproduction data includes execution state information indicating a first execution state, and
    the second executing unit further reproduces, in the second executing unit, the state of the first executing unit, using the execution state information.

3. The information processing system according to claim 1, wherein the reproduction data obtaining unit obtains the reproduction data from the first server.

4. The information processing system according to claim 1, wherein the reproduction data obtaining unit obtains a part of the reproduction data from a third server different from either the first server or the second server.

5. The information processing system according to claim 1, wherein the second executing unit executes the application at the second speed faster than the first speed, using at least the input information items sequentially obtained and contained in the reproduction data, until execution of the application by the second executing unit using current input information from the terminal becomes possible, so as to reproduce, in the second executing unit, the state of the first executing unit.

6. The information processing system according to claim 5, wherein the second executing unit executes the application at the speed corresponding to the first speed, using the input information items sequentially obtained by the input information obtaining unit included in the second server, after the execution becomes possible.

7. An information processing method comprising:
    starting execution of an application at a first speed by a first executing unit included in a first server, using input information items sequentially obtained;
    starting, by the first server, sending a result of execution of the application to a terminal;
    obtaining, by a second server, reproduction data containing the input information items sequentially obtained to reproduce a state of the first executing unit;
    starting, by the second server, obtaining input information items sequentially sent from the terminal in response to an input information transmission instruction to the second server;
    executing the application by a second executing unit included in the second server at a second speed faster than the first speed, using at least the input information items sequentially obtained and contained in the reproduction data, so as to reproduce, in the second executing unit, the state of the first executing unit;
    starting execution of the application by the second executing unit, after the state of the first executing unit is reproduced, at a speed corresponding to the first speed, using the input information items sequentially obtained by the second server;
    starting, by the second server, sending a result of execution of the application of the second executing unit to the terminal; and
    stopping, by the first server, sending the result of execution of the application to the terminal after starting sending the result of execution of the application of the second executing unit to the terminal.

8. A non-transitory, computer readable storage medium for storing an information processing program for causing a computer to function as:
    a first server including;

a first executing unit configured to execute an application at a first speed, using input information items sequentially obtained, and a first transmission unit configured to send a result of execution of the application to a terminal, and a second server including;

a reproduction data obtaining unit configured to obtain reproduction data containing the input information items sequentially obtained, for reproducing a state of the first executing unit, an input information obtaining unit configured to obtain input information items sequentially sent from the terminal in response to an input information transmission instruction to the second server, a second executing unit configured to execute the application, and a second transmission unit configured to send a result of execution of the application by the second executing unit to the terminal, wherein the second executing unit executes the application at a second speed faster than the first speed, using at least the input information items sequentially obtained and contained in the reproduction data, so as to reproduce, in the second executing unit, the state of the first executing unit, wherein the second executing unit, after reproducing the state of the first executing unit, executes the application at a speed corresponding to the first speed, using the input information items sequentially obtained by the second server, and wherein the first server, after the second executing unit starts sending the result of execution of the application to the terminal, stops sending the result of execution of the application to the terminal.

9. A first server comprising:

a first executing unit configured to execute an application at a first speed, using input information items sequentially obtained; and a first transmission unit configured to send a result of execution of the application to a terminal, wherein in a second server including;

a reproduction data obtaining unit configured to obtain reproduction data containing the input information items sequentially obtained, for reproducing a state of the first executing unit, an input information obtaining unit configured to obtain input information items sequentially sent from the terminal in response to an input information transmission instruction to the second server, a second executing unit configured to execute the application, and a second transmission unit configured to send a result of execution of the application by the second executing unit to the terminal, the second executing unit executes the application at a second speed faster than the first speed, using at least the input information items sequentially obtained and contained in the reproduction data, to reproduce in the second executing unit the state of the first executing unit, and after reproduction of the state of the first executing unit, executes the application at a speed corresponding to the first speed, using the input information items sequentially obtained by the second server, and, the first server, after the second executing unit starts sending the result of execution of the application to the terminal, stops sending the result of execution of the application to the terminal.

10. A second server comprising:

a reproduction data obtaining unit configured to obtain reproduction data containing input information items sequentially obtained for reproducing a state of a first executing unit of a first server, wherein the first server includes the first executing unit configured to execute an application at a first speed, using the input information items sequentially obtained, and a first transmission unit configured to send a result of execution of the application to a terminal;

an input information obtaining unit configured to obtain input information items sequentially sent from the terminal in response to an input information transmission instruction to the second server;

a second executing unit configured to execute the application; and a second transmission unit configured to send a result of execution of the application by the second executing unit to the terminal, wherein the second executing unit executes the application at a second speed faster than the first speed, using at least the input information items sequentially obtained and contained in the reproduction data, to reproduce in the second executing unit the state of the first executing unit, wherein after reproduction of the state of the first executing unit, the second executing unit executes the application at a speed corresponding to the first speed, using the input information items sequentially obtained by the second server, and, wherein the first server, after the second executing unit starts sending the result of execution of the application to the terminal, stops sending the result of execution of the application to the terminal.

* * * * *